Figure 1:
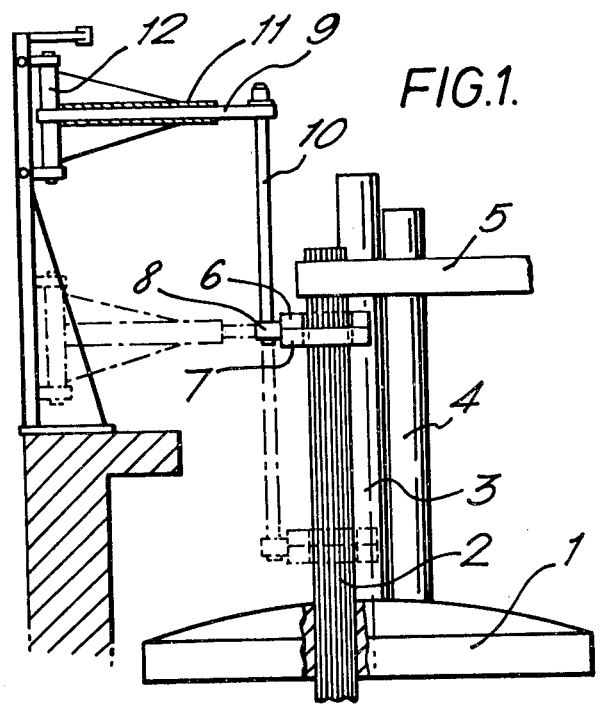

United States Patent [19]

Dunkelmann et al.

[11] 4,438,515
[45] Mar. 20, 1984

[54] PROTECTION OF GRAPHITE ELECTRODES

[75] Inventors: Dietger Dunkelmann, Bocholt; Helmut Jaunich, Raesfeld; Josef Schiffarth, Bocholt-Barlo, all of Fed. Rep. of Germany

[73] Assignee: Foseco Trading A.G., Chur, Switzerland

[21] Appl. No.: 392,463

[22] Filed: Jun. 28, 1982

[30] Foreign Application Priority Data

Jun. 26, 1981 [GB] United Kingdom ............... 8119714

[51] Int. Cl.³ .............................................. H05B 7/06
[52] U.S. Cl. ...................................... 373/88; 118/307
[58] Field of Search .................... 118/307; 373/95, 96, 373/88

[56] References Cited

U.S. PATENT DOCUMENTS 2,858,555 11/1958 Medovick ...................... 118/307 X
3,344,773 10/1967 Engstrom et al. ................. 118/307
3,902,669 9/1975 Keibler .
4,324,315 4/1982 Charlton ........................ 118/307 X

FOREIGN PATENT DOCUMENTS 1375553 11/1974 United Kingdom .
1378384 12/1974 United Kingdom .
1386611 3/1975 United Kingdom .
622506 9/1978 U.S.S.R. .

Primary Examiner—Roy N. Envall, Jr.
Attorney, Agent, or Firm—Cushman, Darby & Cushman

[57] ABSTRACT

Apparatus for protection of graphite electrodes of electric arc furnaces e.g. for steelmaking to reduce loss of graphite from sides of the electrode by oxidation has at least one generally arcuate spray unit and means for moving the spray unit towards and away from a side of the electrode. The spray unit has means for spraying protective matter towards the center of its arc. The apparatus permits protection of the part of an electrode between the electrode clamp and the furnace roof without removing the electrode from the roof.

9 Claims, 5 Drawing Figures

PROTECTION OF GRAPHITE ELECTRODES

The invention concerns protection of graphite electrodes from oxidation and, in particular, concerns apparatus for protecting graphite electrodes for electric arc furnaces and its use.

Graphite electrodes are used in the electric arc furnace steel-making process and during the process substantial loss of graphite from the electrode occurs not only from the tip of the electrode i.e. in the arc zone but also to a considerable extent from the side of the electrode by oxidation.

Graphite for electrodes for electric arc steel-making furnaces is expensive and over many years there have been numerous proposals to provide protective matter on the side of the electrode to reduce loss of graphite by oxidation. None of the known processes is ideal: one difficulty is that the protective matter may interfere with electrical contact between the electrode and the clamp used to supply electric current to the electrode, another difficulty is that the protective matter may not adhere well to the electrode under the conditions of use and yet another difficulty is that application of the protective matter may be troublesome and impractical to effect at sufficiently frequent intervals.

According to the invention, apparatus for applying protective matter to the side of a graphite electrode for an electric arc furnace to reduce loss of graphite from the electrode by oxidation during use comprises a generally arcuate spray unit adapted to be advanced towards a side of the electrode to a position, adjacent a side of the electrode, where the centre of the arc is generally coincident with the axis of the electrode, the spray unit having means for spraying matter for the protection of the electrode generally towards the centre of the arc, and means for moving the spray unit towards and away from a side of the electrode.

For the charging of electric arc steel-making furnaces after a period of use the electrodes are raised and the furnace roof is swung aside. At this stage usually the clamps are left in their positions near the top of the electrodes and the hot electrodes are not wholly removed from the furance roof. The apparatus of the invention enables protective matter satisfactorily to be applied to the side of an electrode in this condition: as the arcuate spray unit can be advanced towards a side of the electrode, the necessary access can be obtained despite the presence of the clamp near the top of the electrode and the fact that part of the electrode is within the furnace roof.

The apparatus is used to apply the protective matter to the side of the electrode between the clamp and the top of the furnace roof. Rather than the apparatus being adapted to apply the protective matter to the entire length of electrode in question at the same time, it is preferred that the apparatus should include means for raising and lowering the spray unit so that the protective matter can be applied sequentially to different levels of the length. By this means the apparatus can be made more compact.

It is preferred that the apparatus should comprise two or more of the arcuate spray units adapted together to enable the protective matter to be simultaneously applied all the way round the electrode. This feature avoids the need for a single spray unit first to apply the protective matter to one part of the periphery of the electrode and then to be moved around the electrode to apply the matter to a further part of the electrode periphery.

In electric arc steel-making furnaces there are three graphite electrodes and the distance between the electrodes is similar to the diameter of the electrodes. This means that access to the sides of the electrodes is very restricted.

In the apparatus of the invention it is particularly preferred that the spray unit or the units should be hingedly mounted on a support which is pivotally mounted on a movable support arm. By moving, e.g. extending or retracting and/or pivoting, the support arm, the spray unit(s) may be moved near the electrode in question and pivoting of the support in relation to the support arm enables the support to be brought to a position in relation to the electrode such that a hingeing movement of the spray unit(s) in relation to the support can serve to bring the centre of the arc of the or each spray unit into a position generally coincident with the axis of the electrode. By this means suitable access to each of the three electrodes can be achieved one by one despite the presence of the other two electrodes. The support arm may be movable up and down in order to provide means for raising and lowering the spray unit(s) as already mentioned.

The apparatus of the invention and its use is especially advantageous in that it enables protective matter to be applied to the electrode without requiring the electrode to be removed altogether from the furnace roof and without requiring the clamp to be removed from the electrode. Accordingly, advantage can be taken of the short periods when the hot electrodes are temporarily out of the furnace whilst the initial charge is added to the furnace after a period of use and discharge of the melt or while a further charge is being added to an already partly charged furnace. A charge can be added to the furnace in a short time and the furnace roof may be swung aside for, say, only two minutes. This time is deliberately kept as short as possible in order to minimise loss of production time. However, by use of the apparatus of the invention one or more of the electrodes can be given on each occasion a protective coating in a short time. Moreover, the electrodes can conveniently be coated relatively frequently and thus, before a coating has been completely consumed as a result of the conditions of use of the electrode, a new coating can be applied over substantially the same area of the electrode.

It is a particular advantage of the apparatus of the invention and its use that it neither requires a supply of especially treated or constructed electrodes nor does it interfere with the normal sequences of operations involved in operating the furnace.

The or each arcuate spray unit has one or more outlets e.g. nozzles for discharging the particulate matter on to the electrode. It is preferred to use a carrier gas stream to entrain and discharge the matter. Preferably the spray unit has a number of separate chambers from which the particulate matter is discharged through separate outlets, one or more for each chamber. The or each chamber preferably has an inlet for pressurised gas to entrain particulate matter in the chamber and discharge it through the outlet(s). The gas inlet is preferably in the opposite side of the chamber to the outlet. Positioned above the or each chamber, there is preferably a hopper, for a supply of the particulate material, and the hopper communicates with the or each chamber. Preferably there is a separate hopper for each chamber.

The spray unit preferably has an aperture or apertures above and/or beneath the outlet or outlets for the particulate material and these apertures are connected to a vacuum source or sources. By this means spray particles of the particulate matter that would fail to reach the electrode or have rebounded from it can be recovered, for recycling, and contamination of the atmosphere and the furnace roof reduced.

Particulate materials for application to hot graphite electrodes to provide a coating to protect the graphite from oxidation are known. In the case of the present invention the material used preferably comprises a graphite-wetting fusible matrix material e.g. a boron compound such as boric oxide and a refractory filler e.g. silicon carbide. Preferably the material contains 30 to 45% by weight of the matrix material and 55 to 70% by weight of the filler. Also, it is preferred that all or most of the material should be in the form of particles containing both the essential ingredients. Moreover, the particles are preferably in the size range of 0.125 mm to 0.5 mm.

Figure 2:
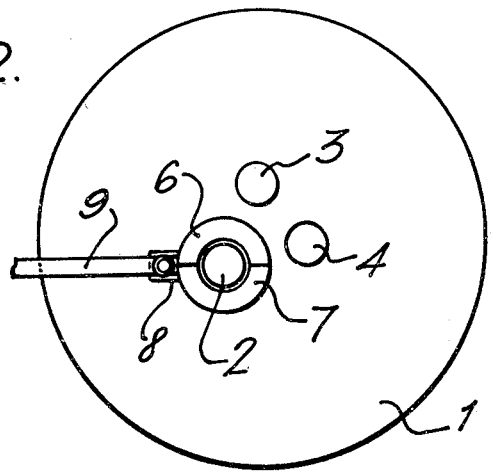
Figure 3:
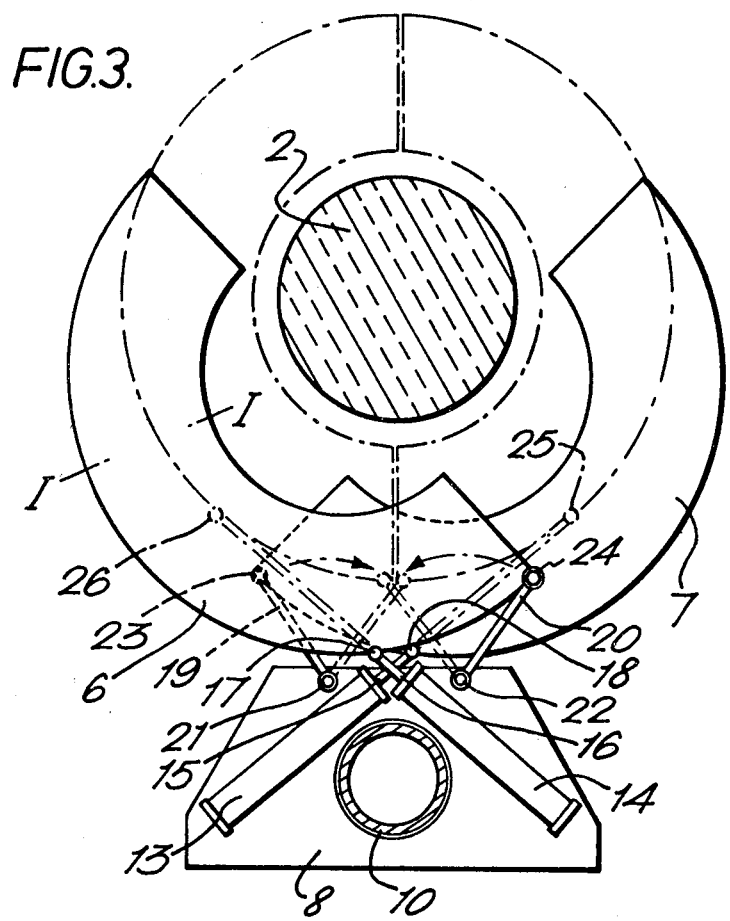
Figure 4:
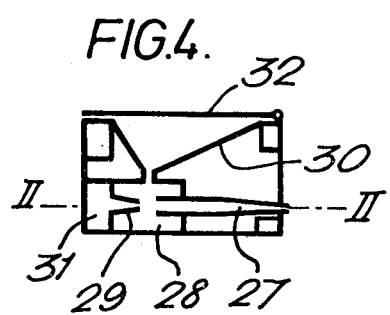
Figure 5:
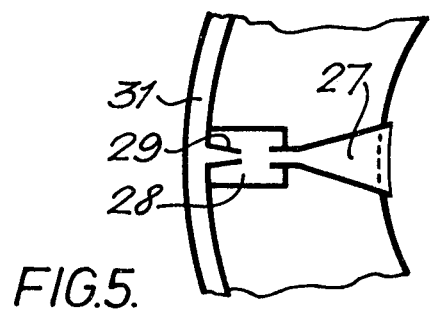

Apparatus of the present invention is further described with reference to the accompanying diagrammatic drawings in which:

FIG. 1 is a general elevation, partly in section, of apparatus of the invention and an arc furnace roof with clamped electrodes, FIG. 2 is a view from above of part of what is shown in FIG. 1, FIG. 3 is a greatly enlarged view from above of part of what is shown in FIGS. 1 and 2, FIG. 4 is an enlarged section along line I—I in FIG. 3 and FIG. 5 is a section along line II—II in FIG. 4.

Referring now to FIGS. 1 and 2, electric arc steelmaking furnace roof 1 is shown swung aside from the furnace (not shown) with graphite electrodes 2, 3 and 4 raised relative to their operating positions but not wholly withdrawn from the roof. The clamps for the electrodes are in position although, for clarity, only the clamp for the electrodes 2, clamp 5, is shown.

Adjacent to the electrodes is positioned apparatus of the invention comprising arcuate spray units 6 and 7 mounted on a support 8 which is pivotally mounted on support arm 9 by means of connecting tube 10. The support arm 9 is movable laterally within guide tube 11 and the guide tube is fixed to pivot axle 12 which is mounted to permit pivoting movement of the guide tube 11 and the support arm 9 in a horizontal plane. The mounting of the pivot axle 12 is such that the axle with the guide tube 11 and support arm 9 can be moved up and down in a vertical plane e.g. from the position shown in full lines in FIG. 1 to that shown in dotted lines.

The support 8 and the mounting on this of the arcuate spray units are shown in greater detail in FIG. 3. The support 8 carries pneumatic or hydraulic cylinders 13 and 14 having respective piston rods 15 and 16. The piston rods 15 and 16 are attached to the spray units 7 and 6 respectively by respective pivot joints 18 and 17. Arms 19 and 20 are attached at one end to the support 8 by respective pivot joints 21 and 22 and at the other end to the spray units 6 and 7 by respective pivot joints 23 and 24. By use of the cylinders 13 and 14 the piston rods can be driven out to reach positions 25 and 26 respectively as a result of which the arcuate spray units 6 and 7 take up the positions shown in dotted lines in FIG. 3 and the arms 19 and 20 pivot to the positions shown in dotted lines in the Figure.

Referring now to FIGS. 4 and 5, each of the spray units has six nozzles 27 of fish-tail shape, each being the outlet for particulate matter entained in gas from a respective chamber 28. Each of the chambers 28 has an inlet nozzle 29 for gas under pressure and, mounted above each of the chambers and communicating with the chamber by a duct is a hopper 30 for a supply of particulate matter. For the supply of gas under pressure to all the chambers of each of the spray units a single duct 31 is present. The hoppers 30 are provided with a lid 32.

In use of the apparatus, the hoppers 30 are charged with particulate matter for providing a coating on a hot graphite electrode to protect it from oxidation. After the furnace roof 1 has been swung aside from the furnace to the position shown in FIG. 1, the spray units are positioned as shown in FIG. 1 by moving the connecting tube 10 to the position shown and by closing the previously open spray units 6 and 7 around the hot electrode 2 as described in connection with FIG. 3.

The gas under pressure is then supplied to the duct 31 of each of the spray units. The pressurised gas enters each of the chambers through the nozzle 29 and entrains particulate matter entering the chamber from the hopper and the gas-entrained matter leaves the chambers through the nozzles 27. The particulate matter adheres to the hot electrode to form a coating to protect the graphite from oxidation. The mounting of the guide tube 11 is gradually moved downwards until the assembly reaches the position shown in dotted lines in FIG. 1 and thus substantially all of the side of the electrode between the clamp 5 and the top of the roof 1 is given the coating. One or more further traverses may be carried out if desired to increase the amount of matter applied to the electrode.

When application of the particulate matter to the electrode is complete, the supply of gas under pressure is cut off and the spray units are removed from the electrode. The other electrodes may then similarly be provided with a coating or this may be done on subsequent occasions when the roof is swung aside from the furnace and the electrodes are hot.

We claim:

1. A method of treating the surface of a hot graphite electrode to provide a protective coating thereon comprising the steps of:
   (a) disposing the electrode along an axis;
   (b) advancing at least one generally arcuate spray unit towards a side of the electrode to a spraying position adjacent a side of the electrode where the centre of the arc is generally coincident with the axis of the electrode; and
   (c) from the spraying position of the unit, spraying matter comprising a graphite-wetting fusible matrix material and a refractory material from said at least one spray unit generally towards the centre of the arc to provide a protective coating on the adjacent side of the electrode.

2. In combination:
   an electric arc furnace graphite electrode held in a desired position along an axis; and
   apparatus for applying protective matter to the side of said electrode to reduce loss of graphite from the electrode by oxidation during use, said apparatus comprising: at least one generally arcuate spray unit movable towards a side of said electrode to a position adjacent a side of said electrode at which position the centre of the spray unit is generally coincident with the axis of said electrode; and said arcuate spray unit having means for spraying matter for the protection of said electrode generally towards the centre of the arc, and means for moving said arcuate spray unit towards and away from a side of said electrode.

3. A combination according to claim 2 further comprising means for raising and lowering the at least one arcuate spray unit for sequential application of the protective matter to the electrode at different vertical levels.

4. A combination according to claim 2 wherein there are at least two arcuate spray units; and wherein said means for moving comprise means for moving said two units together to be advanced towards the sides of the electrode to enable the protective matter to the simultaneously applied all the way round the electrode.

5. In combination:
an electric arc furnace graphite electrode in a desired position having an axis; and
apparatus for applying protective matter to a side of said electrode to reduce loss of graphite from the electrode by oxidation during use, said apparatus comprising: at least one arcuate spray unit having means for spraying matter for the protection of the electrode generally towards the centre of the arc of said unit; means for hingedly mounting said unit on a support pivotally mounted on a movable supporting arm for movement of said at least one arcuate spray unit to a position near said electrode and for pivoting of the support relative to said supporting arm to enable the support to be brought to a position relative to said electrode such that a hingeing movement of said at least one arcuate spray unit relative to the support brings the centre of the arc of said at least one arcuate spray unit into a position generally coincident with the axis of said electrode.

6. A combination according to claim 5 further comprising means for raising and lowering the at least one arcuate spray unit for sequential application of the protective matter to the electrode at different vertical levels.

7. A combination according to claim 5 wherein the at least one generally arcuate spray unit has at least one chamber from which the protective matter can be discharged onto said electrode via at least one outlet, and a hopper is located above and in communication with said at least one chamber for supply of the protective matter to said chamber.

8. A combination according to claim 7 wherein there are a plurality of said chambers, a separate hopper located above and in communication with each of said chambers.

9. A combination according to claim 5 wherein each of said arcuate spray units has at least one outlet for the discharge of the protective matter, and further comprising—adjacent to each of said outlets—an aperture connected to at least one vacuum source means for recovering stray particles of the protective matter.

* * * * *